United States Patent Office 3,795,586
Patented Mar. 5, 1974

3,795,586
RECOVERY OF ENZYMES
Jack Ziffer, Milwaukee, Wis., assignor to Pabst Brewing Company, Milwaukee, Wis.
No Drawing. Original application Aug. 11, 1969, Ser. No. 849,148, now Patent No. 3,700,561. Divided and this application June 14, 1972, Ser. No. 262,558
The portion of the term of the patent subsequent to Oct. 24, 1989, has been disclaimed
Int. Cl. C07g 7/02
U.S. Cl. 195—68                                8 Claims

ABSTRACT OF THE DISCLOSURE

Bacterial amylase, bacterial protease and mixtures thereof are recovered from a bactrial whole culture fermentation medium by a process which involves the addition of an inorganic sulfite, preferably sodium sulfite, which enhances the yield of enzyme as measured by the enzyme activity, produces a whiter product, and inhibits spoilage of a concentrated aqueous solution of the enzyme.

This application is a division of copending application Ser. No. 849,148 filed Aug. 11, 1969, now matured into U.S. Pat. 3,700,561.

BACKGROUND

It is well known that various types of enzymes, which are water soluble, can be produced by fermentation using an aqueous medium containing a microorganism and various nutrients. The microorganisms are available in various culture collections and it is known that certain microorganisms will produce certain enzymes under certain fermentation conditions. The present invention is not concerned with the type of microorganism used or the fermentation conditions.

Once the fermentation has been completed to the desired extent, the whole fermentation culture medium usually consists of a discolored, liquid suspension of finely divided solids which remain suspended and do not settle readily. These suspended solids render the culture medium opaque and are difficult to remove by conventional means such as filtration. The desired enzyme or enzymes, being water soluble, normally remain dissolved in the whole culture. However, they can usually be precipitated by adding a water soluble compound such as, for example, a water soluble salt, which "salts out" the enzymes. Thus, the addition of water soluble compounds to the whole culture could salt out the enzymes which would then exist in an undissolved state along with a number of contaminants.

Enzymes normally are easily degraded and suffer loss of potency due to heat, moisture and contact with other substances. The preparation of enzymes of high potency therefore become a problem.

In recent years the use of protease in domestic and commercial washing compositions and detergents has increased the demand for high potency purified enzymes. It would therefore be desirable to provide a process for producing protease and other enzymes which facilitates the removal of contaminants from the whole culture, protects the enzymes against loss of potency, produces lighter colored filtrates, affords control of pH, permits concentration of the filtrates before separation of the enzymes and without spoilage, and affords economical recovery of high potency enzymes.

OBJECTS

One of the objects of this invention is to provide a new and improved process for producing enzymes.

Another object is to provide a new and improved process for producing protease and/or amylase.

A further object is to provide a new and improved process for producing a protease and other enzymes by a method wherein cells, proteins, carbohydrates and other contaminants are removed from the whole culture in a primary stage while keeping the enzymes in a dissolved state, and the enzymes are removed in a secondary stage.

Another object is to carry out a process of the type described in which precipitated solids from the primary stage are readily separated by filtration.

Another object is to produce ligher colored filtrates from the primary stage.

An additional object is to provide an improved method of controlling pH in the primary and secondary stages.

A further object is to provide a new and improved method of preserving enzymes against loss of potency during the recovery process.

Another object is to provide a new and improved process for recovering high potency enzymes as solids.

Other objects will appear hereinafter.

THE INVENTION

In accordance with the invention, water soluble enzymes are recovered from a whole fermentation culture medium by a process which involves as a primary stage the addition to the whole culture after fermentation is completed of water soluble inorganic compounds which react with one another or with another water soluble inorganic compound already present in the culture medium to precipitate a water insoluble compound or compounds. This "in situ" precipitate carries down with it various contaminants including water insoluble proteins, cells of microorganisms used in the fermentation, carbohydrates, and other materials which normally remain suspended in the fermentation medium and are difficult to remove by the usual methods such as filtration. When combined with the "in situ" preciptate, these contaminants are readily separated. The residual liquid contains the desired enzyme or enzymes which can be recovered. A further feature of the invention involves a secondary stage in which a solid enzyme is precipitated by adding water soluble compounds, at least one of which is preferably an inorganic sulfite, to the residual liquid from the primary stage.

In the primary stage, the "in situ" precipitate can be formed by double decomposition by adding two or more water soluble compounds to the whole culture which react in water to form insoluble precipitates, for example, calcium chloride and disodium hydrogen ortho phosphate to form tricalcium phosphate; aluminum sulfate and sodium carbonate to form aluminum hydroxide; aluminum sulfate and sodium sulfite; calcium chloride, disodium phosphate, sodium sulfite and aluminum sulfate to form a mixed precipitate; calcium chloride, disodium phosphate and sodium carbonate; calcium chloride and sodium sulfite; and calcium chloride, disodium phosphate, sodium carbonate, aluminum sulfate and sodium sulfite.

In the secondary stage, various water soluble compounds can be added to cause the enzyme to precipitate, for example, sodium sulfate, sodium thiosulfate, sodium sulfite, sodium acid sulfite, sodium metabisulfite, sodium hydrosulfite and mixtures thereof. The addition of a water soluble inorganic sulfite has a special beneficial effect in improving the recovery of enzyme. The presence of the sulfite also makes it possible to concentrate the enzyme solution without spoilage by evaporation under subatmospheric pressures. Without the sulfite, a lower yield of enzyme is obtained as measured by the enzyme activity. The sulfite can also be used to control the pH. The addition of the sulfite in the primary and/or secondary stages also produces a whiter enzyme product. Another advantage of using the sulfite is that a concentrated aqueous solution of the enzyme can be stored for several weeks without spoilage.

The addition of zinc compounds in the secondary stage, for example, zinc chloride, zinc sulfate, zinc oxide, zinc acetate or zinc hydroxide, aids separation of the enzyme, especially where filtration is used. Zinc compounds can also be added in the primary stage.

A preferred method of recovery is to centrifuge the precipitated enzyme and mix the wet cake with a sufficient quantity of water absorptive solid diluent to give a dry appearing final product which will normally contain 5% to 7% water. Examples of solid diluents are calcium acetate monohydrate, zinc oxide, sodium sulfate, magnesium sulfate, sodium tripolyphosphate, aluminum sulfate and mixtures thereof.

The pH in the primary and secondary stages will normally be within the range of 5 to 12, depending upon the enzyme. Thus, one protease whole culture might have a pH of 7.0–7.5 and another a pH of 6.7–7.3. An amylase whole culture might have a pH of 7.3–7.6.

The quantity of precipitants added in the primary and secondary stages should be the minimum amounts which will effectively bring about the desired precipitation. In the primary stage this will usually not exceed 1% by weight of the whole culture. In any case, excess soluble salts over the amounts required to produce a precipitate by double decomposition should be avoided where the excess is sufficient to salt out the enzyme.

In the secondary stage the quantity of salt added per unit volume of liquid is important. Below 20% salt the enzyme precipitation is usually incomplete. The amount of salt used as a precipitant is normally just below saturation solubility at the temperature used.

The temperature in the primary and secondary stages should be below those at which substantial decomposition of the enzyme occurs. With protease, amylase or mixtures thereof the temperatures usually do not exceed 33° C.

The following examples, in which the quantities are by weight unless otherwise indicated, illustrate the practice of the invention in producing protease, amylase and mixtures thereof.

EXAMPLE 1

Two hundred milliliters of a 10% (w./v.) aqueous slurry of calcium hydroxide were added slowly to an agitated bacterial protease fermentation whole culture (2000 ml.; 5300 PV units per ml.; $10.6 \times 10^6$ PV units) while maintaining the whole culture pH at 8.5 by the simultaneous addition of a 10% (v./w.) aqueous solution of phosphoric acid. After all the calcium hydroxide was added, the mixture was adjusted to a final pH of 6.5 by the further addition of the diluted phosphoric acid. The mixture was then filtered on a Büchner funnel with the addition of 5% (w./v.) Filteraid FW–14. The resultant filtered cake was washed with distilled water (1500 ml.) and the wash combined with the filtrate. The combined clear solution totalled 3500 ml. and assayed 2000 PV per ml. ($7.0 \times 10^6$ PV units) for an overall protease enzyme recovery of 66%. Sodium sulfate (125 grams) was added to a portion of the combined solution (500 ml.; 2000 PV units per ml.; $1.00 \times 10^6$ PV units) and the mixture stirred for 2 hours at room temperature. The precipitate which formed was filtered and washed with a 25% (w./v.) aqueous solution of sodium sulfate (100 ml.). The filtered wet cake weighed 1.29 grams and assayed 343,000 PV units per gram ($0.442 \times 10^6$ PV units) for a recovery over the precipitation step of 44.2%. The overall recovery from the whole culture to the precipitated wet cake was 29.2%.

EXAMPLE 2

Salts were added slowly to an agitated bacterial protease fermentation whole culture (7100 PV units per ml.) while maintaining the whole culture pH at 6.5–7.0 by the simultaneous addition of aqueous sodium hydroxide or sodium carbonate. The mixtures were then filtered and the filtrates assayed for protease enzyme activity. The $CaCl_2$ and the $NaH_2PO_4$ were added as 25% (w./v.) solutions, with the amount of $NaH_2PO_4$ calculated on a stoichiometric basis. The $NaH_2PO_4$ solutions were adjusted to pH 7 or 9, as indicated.

| Salt additions | | | Protease, percent recovery in filtrate |
|---|---|---|---|
| 1st salt | 2nd salt | pH control | |
| 1% $CaCl_2$ | $NaH_2PO_4$ (pH 7) | 10% (w./v.) NaOH | 104 |
| 2% $CaCl_2$ | $NaH_2PO_4$ (pH 7) | 10% (w./v.) NaOH | 72 |
| 1% $CaCl_2$ | $NaH_2PO_4$ (pH 9) | 10% (w./v.) NaOH | 103 |
| 1% $CaCl_2$ | $NaH_2PO_4$ (pH 7) | 10% (w./v.) $Na_2CO_3$ | 113 |
| 1% $Al_2(SO_4)_3$ | None | 10% (w./v.) NaOH | 82 |
| 1% $MgSO_4$ | None | 10% (w./v.) NaOH | (1) |

[1] Not assayed.

The filtrates from the $CaCl_2$-$NaH_2PO_4$ and the $Al_2(SO_4)_3$ treatments were clear while that from the $MgSO_4$ treatment was turbid. The filtrate from the $Al_2(SO_4)_3$ treatment was very much lighter in color than the other filtrates, however, the filtration rate using this salt treatment was much slower.

A 25% (w./v.) $Na_2SO_4$ solution was then added to the combined filtrates from the $CaCl_2$-$NaH_2PO_4$ treatments, and the precipitated enzyme solid recovered as described in Example 1 except that the wet cake wash step was omitted. A wet cake assaying 763,400 PV units per gram was obtained, with a protease enzyme recovery of 64%.

A 25% (w./v.) $Na_2SO_4$ solution was added to the filtrate from the $Al_2(SO_4)_3$ treatment and the precipitated enzyme solid recovered in a like manner. A wet cake assaying 771,000 PV units per gram was obtained, with a protease enzyme recovery of 75%. The enzyme wet cake obtained in this manner was very much lighter in color than that obtained from the $CaCl_2$-$NaH_2PO_4$ treatment.

EXAMPLE 3

A 25% (w./v.) $CaCl_2$ solution and a 25% (w./v.) $Na_2HPO_4$ solution were slowly added to an agitated bacterial protease fermentation whole culture (42 gallons, 6300 PV units per ml., $1.00 \times 10^9$ PV units) while maintaining the whole culture pH at 6.3–6.7 by the simultaneous addition of a $Na_2CO_3$ solution. The amount of $CaCl_2$ added was 1% (w./v.) based on the whole culture, with the $Na_2HPO_4$ added on a calculated stoichiometric basis. The mixture was then filtered using Filteraid FW–14 and the filtered cake washed with water. The combined filtrate and wash totalled 98.9 gallons and contained $0.96 \times 10^9$ PV units, for a protease enzyme recovery of 96%.

EXAMPLE 4

Using the same bacterial protease fermentation whole culture described in Example 3, a similar filtration experiment was carried out using $Al_2(SO_4)_3$. A 15% (w./v.) solution of $Al_2(SO_4)_3$ was slowly added to the agitated bacterial protease fermentation whole culture (43 gallons, 6300 PV units per ml., $1.02 \times 10^9$ PV units) while maintaining the whole culture pH at 6.3–6.7 by the simultaneous addition of a $Na_2CO_3$ solution. The amount of $Al_2(SO_4)_3$ added was 1% (w./v.) based on the whole culture. The mixture was then filtered using Filteraid FW–14 and the filtered cake washed with water. The combined clear filtrate and wash totalled 98.7 gallons and contained $0.945 \times 10^9$ PV units, for a protease enzyme recovery of 92.7%.

A portion of the filtrate obtained above (10,000 ml., 3150 PV units per ml., $31.5 \times 10^6$ PV) was treated with 2500 grams of $Na_2SO_4$ as a 25% (w./v.) solution in the manner indicated in Example 1. The recovered precipitated enzyme solid contained $17.8 \times 10^6$ PV units, for a protease enzyme recovery of 56.5%.

EXAMPLE 5

The $Al_2(SO_4)_3$ filtrate obtained in Example 4 was then treated with $Na_2SO_4$. Aliquots of the filtrate (500 ml.; 3300 PV units per ml., $1.65 \times 10^6$ PV units) were adjusted to the pH levels shown below using sodium acid sulfate and the $Na_2SO_4$ added as a 25% (w./v.) solution to precipitate the protease enzyme.

| Filtrate adjusted to indicated pH: | Protease enzyme activity in precipitated cake, percent recovery |
|---|---|
| 5.5 | 78.2 |
| 6.0 | 76.7 |
| 6.5 | 72.1 |
| 7.0 | 70.5 |
| 7.5 | 75.3 |

EXAMPLE 6

A bacterial protease fermentation whole culture was treated with 1% $Al_2(SO_4)_3$ in the manner described in Example 4, with a protease enzyme recovery of 99.5% in the clear light colored filtrate. The salts indicated below were then added to aliquots of the filtrate. The mixtures (pH 6.5) were held at 33° C. for 2 hours and the precipitated protease enzyme recovered by filtration. The protease enzyme solids precipitated in the presence of the sulfite salts were very much lighter in color than those precipitated by the other salts.

| Salts added to filtrate, percent (w./v.) | Protease activity in precipitated cake, percent recovery |
|---|---|
| 25% $Na_2SO_4$ | 68.9 |
| 25% $Na_2SO_4$ + 5% $Na_2SO_3$ + 5% $Na_2S_2O_5$ | 92.3 |
| 25% $Na_2SO_3$ + 11.4% $Na_2S_2O_5$ | 90.6 |
| 35% NaCl | <25 |

EXAMPLE 7

The bacterial protease filtrate obtained in Example 6 after treatment of the fermentation whole culture with $Al_2(SO_4)_3$ was used in a test to evaluate the amount of sulfite salts which should be added with the sodium sulfate to precipitate the protease enzyme. The following salt combinations were added to 500 ml. aliquots of filtrate (3300 PV units per ml., 1,650,000 PV units) and the mixtures held at 33° C. for 2 hours. The mixtures were then filtered on a Büchner funnel using Filteraid FW-20. The recovered precipitated enzyme cakes contained the indicated activities.

| Salts added, percent (w./v.) | | | Protease activity in precipitates | |
|---|---|---|---|---|
| $Na_2SO_4$ | $Na_2SO_3$ | $Na_2S_2O_5$ | Total PV | Percent recovery |
| 25 | 0.0 | 0.0 | 1,164,500 | 70.6 |
| 25 | 4.4 | 0.7 | 1,432,250 | 86.8 |
| 25 | 3.0 | 2.0 | 1,466,250 | 88.9 |
| 25 | 1.5 | 1.0 | 1,432,000 | 86.8 |
| 25 | 0.6 | 0.4 | 1,211,250 | 73.4 |
| 25 | 0.2 | 0.3 | 1,232,500 | 74.7 |

EXAMPLE 8

The bacterial protease filtrate obtained in Example 6 after treatment of the fermentation whole culture with $Al_2(SO_4)_3$ was used in a liquid heat stability test to determine the effectiveness of the sulfite salts in preventing the loss of protease enzyme activity at elevated temperatures. Filtrate-sulfite salt solutions were prepared as shown below and the solutions (pH 6.5) held at the indicated temperatures for 20 hours. The sulfite salt mixture consisted of 60% $Na_2SO_3$ and 40% $Na_2S_2O_5$.

| Total sulfite salts added, percent (w./v.) | Temp. (° C.) | Percent protease activity remaining after 20 hours |
|---|---|---|
| 0 | 5 | 96.8 |
| 1 | 5 | 96.8 |
| 5 | 5 | 96.8 |
| 10 | 5 | 95.0 |
| 0 | 33 | 91.9 |
| 1 | 33 | 93.6 |
| 5 | 33 | 95.2 |
| 10 | 33 | 93.6 |
| 0 | 37 | 86.3 |
| 1 | 37 | 87.9 |
| 5 | 37 | 86.3 |
| 10 | 37 | 80.2 |
| 0 | 56 | <1.0 |
| 1 | 56 | <1.0 |
| 5 | 56 | 6.1 |
| 10 | 56 | 17.1 |

EXAMPLE 9

A bacterial protease fermentation whole culture was treated with 1% $Al_2(SO_4)_3$ in the manner described in Example 4, with a protease enzyme recovery of 88.5% in the clear filtrate.

The following salts were added to aliquots of the filtrate at pH 6.5 and 33° C. and the mixtures held at this temperature for 2 hours before filtering the precipitated protease enzyme.

| Salts added to filtrate, percent (w./v.) | Protease activity in precipitated cake, percent recovery |
|---|---|
| 25% $Na_2SO_4$ | 81.6 |
| 25% $Na_2SO$ 25% $Na_2SO_4$ + 3% $Na_2SO_3$ + 2% $Na_2S_2O_5$ | 93.9 |
| 25% $Na_2SO_4$: | |
| +0.5% sodium thiosulfate | 86.7 |
| +1.0% sodium thiosulfate | 84.7 |
| +2.5% sodium thiosulfate | 80.6 |
| +5.0% sodium thiosulfate | 83.7 |
| +10.0% sodium thiosulfate | 87.8 |

EXAMPLE 10

Using the procedure described in Example 4, a 15% (w./v.) solution of $Al_2(SO_4)_3$ was slowly added to an agitated bacterial protease fermentation whole culture (1000 ml., 6170 PV units per mil., $6.17 \times 10^6$ PV units) while maintaining the whole culture pH at 6.2 by the simultaneous addition of a $Na_2SO_3$ solution. The amount of $Al_2(SO_4)_3$ added was 1% (w./v.) based on the whole culture. The amount of $Na_2SO_3$ used was 2.2% (w./v.) based on the whole culture. The mixture was then filtered on a Büchner funnel using Filteraid FW-20 and the filtered cake washed with water. The combined clear filtrate and wash totalled 1230 ml. and contained $6.08 \times 10^6$ PV units for a protease enzyme recovery of 98.5%. A salt mixture consisting of $Na_2SO_4$ (50 grams), $Na_2SO_3$ (4.8 grams) and $NaHSO_3$ (2.8 grams) was then added to an aliquot of the filtrate (200 ml.; 4700 PV units per ml., 940,000 PV units) and the mixture stirred for 2 hours at 33° C. The precipitated protease enzyme solid was recovered by filtration and contained 860,000 PV units, for a protease enzyme recovery of 91.5%. The recovered solid had a very light color.

EXAMPLE 11

Using the procedure described in Example 4, a 15% (w./v.) solution if $Al_2(SO_4)_3$ was slowly added to an agitated bacterial protease fermentation whole culture (90 gallons; 5872 PV units per ml., $2.000 \times 10^9$ PV units) while maintaining the whole culture pH at 6.5 by the simultaneous addition of a $Na_2SO_3$ solution. The amount of $Al_2(SO_4)_3$ added was 1% (w./v.) based on the whole culture. The amount of $Na_2SO_3$ used was 2.5% (w./v.) based on the whole culture. The volume of the whole culture after the addition of the salts was 110 gallons and it assayed 5230 PV units per ml. (2.170×10⁹ PV units). The treated whole culture was then filtered on a plate and frame press using Filteraid FW–14 and washed with water. The combined clear filtrate and wash totalled 192.4 gallons and contained 2.162×10⁹ PV units. The combined filtrate and wash was then evaporated in vacuo to 78.9 gallons. This concentrate contained 2.050×10⁹ PV units. A salt mixture consisting of NaSO (2500 grams), NaSO₃ (150 grams) and NaHSO₃ (100 grams) was added to an aliquot of the concentrate (10,000 ml.; 6288 PV units/ml., 62.88×10⁶ PV units) and the mixture stirred for 2 hours at 33° C. The precipitated protease enzyme solid was recovered using a Sharples Super Centrifuge. A total of 143 grams of wet solid (42.5% solids) assaying 410,000 PV units per grams (58.6×10⁶ PV units) were obtained, for a protease enzyme recovery of 93.2%. A portion of this wet solid was dried in vacuo at room temperature and a dry protease solid assaying 891,250 PV units per gram (96.2% solids) was obtained. Since the calculated theoretical dry solid potency was 964,700 PV units per gram, the recovery over the drying step was 96.0%.

A 50-gram portion of the centifuged enzyme solid (20.5×10⁶ PV units) was washed by slurrying the solid in a 25% (w./v.) Na₂SO₄ solution (1000 ml.) and then recentrifuging the mixture. A total of 37 grams of washed protease enzyme solid (42.0% solids) assaying 600,000 PV units per gram (22.2×10⁶ PV units) were obtained, for a 108.3% recovery. A portion of this wet solid was dried in vacuo at room temperature and a dry protease solid assaying 1,262,500 PV units/gram (96.4% solids) was obtained. Since the calculated theoretical dry solid potency was 1,428,600 PV per gram, the recovery over the drying step was 91.7%.

EXAMPLE 12

Using the procedure described in Example 4, a 25% (w./v.) CaCl₂ solution (20 ml.) and a 25% (w./v.) Na₂HPO₄ solution (17.1 ml.) were added to an agitated bacterial protease fermentation whole culture (500 ml.; 7760 PV units per ml., 3.88×10⁶ PV units) while maintaining the whole culture pH at 6.4 by the simultaneous addition of a 25% Na₂SO₃ solution (15 ml.). The amount of CaCl₂ added was 1% (w./v.) and the amount of Na₂HPO₄ added was 0.86% (w./v.), based on the whole culture. A 15% Al₂(SO₄)₃ solution (50 ml.) was then added to the agitated whole culture while maintaining the whole culture pH at 6.4 by the simultaneous addition of a 25% Na₂SO₃ solution (80 ml.). The amount of Al₂(SO₄)₃ added was 1.5% (w./v.) based on the whole culture. The total Na₂SO₃ added was 4.75% (w./v.) based on the whole culture. The mixture was then filtered on a Büchner funnel. The resultant clear filtrate (690 ml.) asssayed 5920 PV units per ml. (4.08×10⁶ PV units), for a protease enzyme recovery of 105.2%.

EXAMPLE 13

Using the procedure described in Example 4, a 25% (w./v.) CaCl₂ solution (20 ml.) and a 15% (w./v.) Al₂(SO₄)₃ solution (50 ml.) were added slowly to an agitated bacterial protease fermentation whole culture (500 ml.; 7760 PV units per ml., 3.88×10⁶ PV units) while maintaining the whole culture pH at 6.4 by the simultaneous addition of a 25% (w./v.) Na₂SO₃ solution (100 ml.). The amount of CaCl₂ added was 1% (w./v.), the amount of Al₂(SO₄)₃ added was 1.5% (w./v.) and the amount of Na₂SO₃ added was 5% (w./v.), based on the whole culture. The mixture was filtered on a Büchner funnel. The resultant clear filtrate (680 ml.) assayed 5632 PV units per ml. (3.83×10⁶ PV units), for a protease enzyme recovery of 98.7%.

EXAMPLE 14

Using the procedure described in Example 4, a 15% (w./v.) Al₂(SO₄)₃ solution (66.6 ml.) was added slowly to an agitated bacterial amylase fermentation whole culture (1000 ml.; 2592 DV units per ml., 2.592×10⁶ DV units; 1325 PV units per ml., 1.325×10⁶ PV units) while maintaining the whole culture pH at 6.8 by the simultaneous adidtion of 30% (w./v.) Na₂SO₃ (70 ml.). The amount of Al₂(SO₄)₃ added was 1% (w./v.) and the amount of Na₂SO₃ added was 2.1% (w./v.), based on the whole culture. The mixture was then filtered on a Büchner funnel. The resultant clear filtrate (1140 ml.) assayed 1287 DV units per ml. (1.465×10⁶ DV units), for an amylase activity recovery of 56.4%.

EXAMPLE 15

Using the procedure described in Example 4, a 25% (w./v.) CaCl₂ solution (20 ml.) and a 25% (w./v.) Na₂HPO₄ solution (17.1 ml.) were added to an agitated bacterial amylase fermentation whole culture (500 ml.; 2592 DV units per ml., 1,296×10⁶ DV units; 1325 PV units per ml., 0.663×10⁶ PV units) while maintaining the whole culture pH at 7.0 by the simultaneous addition of a 25% (w./v.) Na₂CO₃ solution (20 ml.). The amount of CaCl₂ added was 1% (w./v.), the amount of Na₂HPO₄ added was 0.86% (w./v.) and the amount of Na₂CO₃ added was 1% (w./v.), based on the whole culture. The mixture was then filtered on a Buchner funnel. The resultant clear filtrate (560 ml.) assayed 2384 DV units per ml. (1.335×10⁶ DV units) for a amylase activity recovery of 103.0%, and 1225 PV units per ml. (0.686×10⁶ PV units) for a protease activity recovery of 103.5%. A salt mixture consisting of Na₂SO₄ (37.5 grams) Na₂SO₃ (6.5 grams) and NaHSO₃ (1.5 grams) was then added to an aliquot of the filtrate (150 ml.; 357,600 DV units; 183,750 PV units) and the resultant mixture stirred for 2 hours at 33° C. The precipitated enzyme solid (1.47 grams) was recovered by filtration. The wet cake assayed 189,000 DV units per gram (277,830 DV units) for an amylase activity recovery of 77.7%, and 107,000 PV units per gram (157,290 PV units) for a protease activity recovery of 85.6%.

EXAMPLE 16

Using the procedure described in Example 4, a 25% (w./v.) CaCl₂ solution (20 ml.) was added to an agitated bacterial amylase fermentation whole culture (500 ml.; 2592 DV units per ml., 1.296×10⁶ DV units; 1325 PV units per ml.; 0.663×10⁶ PV units) while maintaining the whole culture pH at 7.0 by the simultaneous addition of a 25% (w./v.) Na₂SO₃ solution (22.7 ml.). The amount of CaCl₂ added was 1% (w./v.) and the amount of Na₂SO₃ was 1.13% (w./v.) based on the whole culture. The mixture was then filtered on a Buchner funnel. The resultant clear filtrate (550 ml.) assayed 2353 DV units per ml. (1.294×10⁶ DV units) for an amylase activity recovery of 99.8%, and 1180 PV units per ml. (0.649×10⁶ PV units) for a protease activity recovery of 97.9%. A salt mixture consisting of Na₂SO₄ (50 grams), Na₂SO₃ (6 grams) and NaHSO₃ (2 grams) was then added to an aliquot of the filtrate (200 ml.; 470,600 DV units; 236,000 PV units) and the mixture stirred for 2 hours at 33° C. The precipitated solid was recovered by filtration (1.95 grams) and assayed 200,000 DV units per gram (390,000 DV) for an amylase activity recovery of 82.9%, and 94,000 PV units per gram (183,300 PV) for a protease activity recovery of 77.7%.

EXAMPLE 17

Using the procedure described in Example 4, a 25% (w./v.) CaCl₂ solution (20 ml.) and a 25% (w./v.) Na₂HPO₄ solution (17.1 ml.) were added to an agitated bacterial amylase fermentation whole culture (500 ml.; 2592 DV units per ml., 1.296×10⁶ DV units; 1325 PV units per ml., 0.663×10⁶ PV units) while maintaining the whole culture pH at 7.0 by the simultaneous addition of a 25% (w./v.) Na₂SO₃ solution (15 ml.). The amount of CaCl₂ added was 1% (w./v.), the amount of Na₂HPO₄ added was 0.75% (w./v.), based on the whole culture. The mixture was filtered on a Buchner funnel. The resultant clear filtrate (560 ml.) assayed 2353 DV units per ml. (1.318×10⁶ DV units) for an amylase activity recovery of 101.7%, and 1375 PV units per ml. (0.770×10⁶ PV units) for a protease activity recovery of 116.1%. A salt mixture consisting of $Na_2SO_4$ (50 grams), $Na_2SO_3$ (6 grams) and $NaHSO_3$ (2 grams) was then added to an aliquot of the filtrate (200 ml.; 470,600 DV units; 275,000 PV units) and the mixture stirred for 2 hours at 33° C. The precipitated solid was recovered by filtration (1.70 grams wet cake) and assayed 239,000 DV units per gram (406,300 DV) for an amylase activity recovery of 86.3%, and 147,000 PV units per gram (249,900 PV) for a protease activity recovery of 90.9%.

EXAMPLE 18

Using the procedure described in Example 4, a 25% (w./v.) $CaCl_2$ solution (20 ml.) and a 25% (w./v.) $Na_2HPO_4$ solution (17.1 ml.) were added slowly to an agitated bacterial amylase fermentation whole culture (500 ml.; 2592 DV units per ml., 1.296×10⁶ DV units; 1325 PV units per ml., 0.663×10⁶ PV units) while maintaining the whole culture pH at 7.0 by the simultaneous addition of a 25% (w./v.) $Na_2SO_3$ solution (60 ml.). Then a 15% (w./v.) $Al_2(SO_4)_3$ solution (33.3 ml.) was added slowly to the agitated whole culture while maintaining the whole culture pH at 7.0 by the simultaneous addition of a 25% (w./v.) $Na_2SO_3$ solution (60 ml.). The amount of $CaCl_2$ added was 1%, the amount of $Na_2HPO_4$ added was 0.86%, the amount of $Na_2CO_3$ added was 1%, the amount of $Al_2(SO_4)_3$ added was 1% and the amount of $Na_2SO_3$ added was 3%, based on the whole culture. The mixture was filtered on a Buchner funnel. The resultant clear filtrate (660 ml.) assayed 1848 DV units per ml. (1.220×10⁶ DV units) for an amylase activity recovery of 94.1%, and 1180 PV units per ml. (0.779×10⁶ PV units) for a protease activity recovery of 117.5%. A salt mixture consisting of $Na_2SO_4$ (62.5 grams), $Na_2SO_3$ (3.0 grams) and $NaHSO_3$ (2.0 grams) was added to an aliquot of the filtrate (250 ml.; 462,000 DV units; 295,000 PV units and the mixture stirred for 2 hours at 33° C. The precipitated solid was recovered by filtration (1.65 grams wet cake) and assayed 255,000 DV units per gram (420,750 DV units) for an amylase activity recovery of 91.1% and 155,000 PV units per gram (255,750 PV units) for a protease activity recovery of 86.7%.

EXAMPLE 19

Using the procedure described in Example 11, a bacterial protease fermentation whole culture was processed to yield a centrifuged protease enzyme wet solid assaying 490,000 PV units per gram. Portions of the wet solid were then mixed with various salts to give dry solid blends, eliminating the need to go through a drying step.

| Grams | | Protease activity, PV/g. | |
|---|---|---|---|
| | | Theory | Found |
| 2 | Protease wet solid | 44,000 | 42,000 |
| 5 | Calcium acetate | | |
| 15 | Sodium tripolyphosphate | | |
| 2 | Protease wet solid | 44,000 | 43,920 |
| 5 | Calcium acetate | | |
| 0.1 | Zinc oxide | | |
| 15 | Sodium tripolyphosphate | | |
| 2 | Protease wet solid | 36,000 | 30,866 |
| 5 | Calcium acetate | | |
| 5 | Sodium sulfate | | |
| 15 | Sodium tripolyphosphate | | |
| 2 | Protease wet solid | 40,000 | 40,666 |
| 5 | Calcium acetate | | |
| 2.5 | Magnesium sulfate | | |
| 15 | Sodium tripolyphosphate | | |
| 2 | Protease wet solid | 40,000 | 40,666 |
| 5 | Calcium acetate | | |
| 2.5 | Sodium thiosulfate | | |
| 15 | Sodium tripolyphosphate | | |
| 2 | Protease wet solid | 44,000 | 42,880 |
| 5 | Calcium acetate | | |
| 0.1 | Zinc sulfate | | |
| 15 | Sodium tripolyphosphate | | |

The invention makes it possible to economically process and produce high potency enzymes such as, for example, bacterial protease, bacterial amylase, and mixtures of bacterial protease and bacterial amylase, from whole cultures, usually obtained by fermentation with Bacillus subtilis in a nutrient medium and containing 85–95% water, together with the enzymes dissolved in the water, and cells which remain from the microorganisms as well as soluble or insoluble proteins, carbohydrates, and small amounts of salts. These whole cultures are normally brown, turbid and opaque. It is essential from a practical standpoint to recover the enzymes in as light a state as possible. The reaction of two or more compounds in the primary stage, for example, calcium chloride and monosodium or disodium phosphate and/or aluminum sulfate and sodium carbonate to form water insoluble precipitates causes coprecipitation of the cells and other by-products. By adding sodium sulfite or other water soluble inorganic sulfite in the primary stage the pH can be raised to a range where the enzymes are least subject to degradation, usually at least 6.5 and preferably 6.5–7.6, while the sulfite itself affords enhanced protection against degradation. The precipitated solids can then be separated by filtration or otherwise and the residual liquid processed in the secondary stage.

In the secondary stage, it is desirable first to concentrate by evaporation, usually under vacuum and at a temperature insufficiently high to degrade the enzyme, for example, not in excess of 33° C. The main reason for this is that the filter cake or centrifuge cake from the primary stage is washed with water to remove any entrained or adsorbed enzymes. The washings are added to the filtrate which increases the volume of the residual. This could be further processed as such but would require the addition of larger quantities of salts. Hence, by concentrating it two or three times the process is more economical. However, too much concentration should be avoided because other substances may be occluded when the enzyme is precipitated. The addition of sodium sulfite, sodium bisulfite, sodium hydrosulfite, sodium hyposulfite, sodium sulfate, sodium thiosulfate, zinc chloride, zinc sulfate, and/or zinc oxide serves several purposes as previously indicated. The sulfites can be used to control the pH, usually within the range of 6.5–7.6. They also protect the enzymes against degradation. All of the soluble salts have a salting out effect. The zinc compounds modify the physical form of the enzyme particles and make them easier to separate from the liquid.

I claim:

1. In the recovery of an enzyme from the group consisting of bacterial amylase, bacterial protease, and mixtures thereof from an aqueous liquid, the process which comprises precipitating said enzyme in the presence of an inorganic sulfite while maintaining a pH within the range of 5 to 12.

2. In the recovery of an enzyme from the group consisting of bacterial amylase, bacterial protease and mixtures thereof from an aqueous whole culture fermentation medium, the process which comprises precipitating the enzyme in the presence of sodium sulfite while maintaining a pH within the range of 5 to 12.

3. A process as claimed in claim 1 in which said enzyme comprises protease.

4. A process as claimed in claim 1 in which said enzyme comprises amylase.

5. A process as claimed in claim 1 in which an inorganic zinc compound is added to said aqueous liquid.

6. A process as claimed in claim 1 in which an inorganic soluble zinc salt is added to said aqueous liquid.

7. A process as claimed in claim 1 in which zinc oxide is added to said aqueous liquid.

8. A process as claimed in claim 1 in which said aqueous liquid containing said enzyme is concentrated in the presence of said sulfite.

References Cited

UNITED STATES PATENTS

| | | | |
|---|---|---|---|
| 3,700,561 | 10/1972 | Ziffer | 195—66 R |
| 3,627,640 | 12/1971 | Blumberg et al. | 195—68 |
| 3,141,832 | 7/1964 | Burdick | 195—63 X |
| 3,031,380 | 4/1962 | Minagawa et al. | 195—66 R |
| 3,284,316 | 11/1966 | Cayle | 195—68 X |
| 3,524,798 | 8/1970 | Lloyd et al. | 195—68 X |

DAVID M. NAFF, Primary Examiner

U.S. Cl. X.R.

195—66 R